(12) United States Patent
Chen et al.

(10) Patent No.: US 10,761,511 B2
(45) Date of Patent: Sep. 1, 2020

(54) PRINTING APPARATUS AND PRINTING METHOD FOR BIOCHIP FABRICATION

(71) Applicant: National Taiwan Normal University, Taipei (TW)

(72) Inventors: Syuan-Yi Chen, Taipei (TW); Meng-Chen Yang, Taipei (TW); Kai-Wen Chuang, Taipei (TW); Ren-Bin Lai, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 191 days.

(21) Appl. No.: 16/176,414

(22) Filed: Oct. 31, 2018

(65) Prior Publication Data

US 2019/0243337 A1  Aug. 8, 2019

(30) Foreign Application Priority Data

Feb. 7, 2018 (TW) .............................. 107104263 A

(51) Int. Cl.
*G05B 19/4099* (2006.01)
*G06T 7/00* (2017.01)
*B33Y 50/02* (2015.01)

(52) U.S. Cl.
CPC .......... *G05B 19/4099* (2013.01); *B33Y 50/02* (2014.12); *G06T 7/0004* (2013.01); *G06T 7/0006* (2013.01); *G05B 2219/40585* (2013.01); *G05B 2219/45031* (2013.01); *G05B 2219/49007* (2013.01); *G06T 2207/30072* (2013.01); *G06T 2207/30148* (2013.01)

(58) Field of Classification Search
CPC ................................................ G05B 19/4099
See application file for complete search history.

*Primary Examiner* — Tejal Gami
(74) *Attorney, Agent, or Firm* — Birch, Stewart, Kolasch & Birch, LLP

(57) ABSTRACT

A printing method for biochip fabrication is implemented by a printing apparatus including a platform for supporting a substrate, a pipet module, and a control module. The method includes: moving the platform in sequence to multiple positions associated with multiple to-be-printed points on the platform; moving the pipet module reciprocatively toward and away from the platform during each movement of the platform; discharging, by the pipet module, solution sample onto the respective one of the to-be-printed points to form a bio-sensing spot to form a biochip; and determining, by the control module, whether to execute a supplementary printing procedure for the biochip based on whether each bio-sensing spot satisfies a predetermined criterion.

19 Claims, 6 Drawing Sheets

PRINTING APPARATUS AND PRINTING METHOD FOR BIOCHIP FABRICATION

CROSS-REFERENCE TO RELATED APPLICATION

This application claims priority to Taiwanese Patent Application No. 107104263, filed on Feb. 7, 2018.

FIELD

The disclosure relates to a printing method and a printing apparatus for making biochips.

BACKGROUND

In recent years, with advancements in genetic research, biochips are frequently used to perform numerous simultaneous biochemical reactions. A biochip usually includes hundreds or thousands of bio-sensing spots (i.e., biosensors) that are arranged in a microarray, and the bio-sensing spots contain, e.g., deoxyribonucleic acid or proteins therein.

A conventional printing apparatus for making biochips usually includes a platform, a pipet module and a manipulator. The platform is for supporting thereon a substrate to be processed and turned into a biochip. The pipet module contains solution sample therein. The manipulator supports the pipet module and is configured to drive movements of the pipet module in three dimensions.

In a conventional process for making a biochip, a substrate is manually placed on the platform at a predetermined position, then the manipulator is controlled to bring the pipet module to move to a position where the pipet module is expected to be aligned with a to-be-printed point on the substrate and to move toward the chip, and the pipet module is driven to discharge a droplet of the solution sample onto the to-be-printed point to form a bio-sensing spot. By repeating the abovementioned operations, a biochip having a microarray of the bio-sensing spots thereon can be made from the chip.

However, since the substrate is placed on the platform manually, a yield rate of making biochip with the conventional process may drop if the substrate is not positioned accurately on the platform and deviates from the predetermined position. Further, when the solution sample contained in the pipet module has bubbles, an amount of the solution sample discharged from the pipet module onto the to-be-printed point may be insufficient to make a good bio-sensing spot that can perform the biochemical reaction normally, and the yield rate may also drop accordingly.

SUMMARY

Therefore, an object of the present disclosure is to provide a printing apparatus and a printing method for alleviating at least the drawbacks mentioned above.

According to one aspect of the present disclosure, a printing apparatus for biochip fabrication is provided. The printing apparatus includes a platform, a pipet module, an image capturing module, a driving unit, a control module and an image analyzing module. The platform has a top surface for supporting one or more substrates thereon, and is movable in a manner that the top surface is moved in an imaginary plane. The pipet module is disposed movably above the platform, is configured to contain optionally one or more solution samples therein, and is formed with one or more outlets each discharging a corresponding one of the solution sample(s). The image capturing module is disposed movably above the platform near the pipet module, and is configured to be activated in response to a triggering signal. The driving unit is connected to the platform, the pipet module and the image capturing module, and is configured to drive movement of each of the platform and the pipet module in a manner that the top surface is movable in the imaginary plane and that the pipet module is movable above the top surface, and to drive operation of the pipet module in a manner that the pipet module discharges the solution sample(s) through at least one of the outlet(s). The control module is electrically connected to the driving unit and the image capturing module, and is configured to execute a main printing procedure for each of the substrate(s) to:

control the driving unit to drive the platform to move to a plurality of positions in sequence according to a predetermined route associated with a plurality of to-be-printed points on the substrate that is placed on the top surface, the plurality of to-be-printed points forming a microarray, wherein for each movement of the platform to one of the positions, each of the outlet(s) of the pipet module is aligned with a corresponding one of the to-be-printed points when the platform is moved to said one of the positions;

control the driving unit to drive the pipet module to drive movement of the pipet module in a manner that each of the outlet(s) moves reciprocatively between a printing position adjacent to the top surface and a standby position distal from the top surface, wherein, upon completion of each movement of the platform to the one of the positions, each of the outlet(s) has moved from the standby position thereof to the printing position thereof; and control the driving unit to drive the pipet module such that, right when the platform is moved to said one of the positions, the pipet module discharges, through each of the outlet(s), a droplet of a corresponding one of the solution sample(s) onto the corresponding one of the to-be-printed points to form a bio-sensing spot.

After the main printing procedure is completed, a biochip is formed from the substrate and has a microarray of the bio-sensing spots respectively on the to-be-printed points, and the control module is further configured to output the triggering signal to the image capturing module such that the image capturing module is activated in response to the triggering signal to capture a first image of the biochip. The image analyzing module is electrically connected to the image capturing module and the control module, and is configured to, in response to receipt of the first image of the biochip from the image capturing module, determine whether each of the bio-sensing spots in the first image of the biochip satisfies a predetermined criterion so as to generate a first analysis result and to output the first analysis result to the control module.

According to another aspect of the present disclosure, a printing method for biochip fabrication is provided. The method is to be implemented by a printing apparatus. The printing apparatus includes a platform that has a top surface for supporting one or more substrates thereon and that is movable in a manner that the top surface is moved in an imaginary plane, a pipet module that is disposed movably above the platform and that contains optionally one or more solution samples therein, an image capturing module, a driving unit, an image analyzing module, and a control module. The method includes steps of:

executing a main printing procedure for each of the substrate(s) to drive, by the driving unit, movement of the platform to a plurality of positions in sequence according to a predetermined route associated with a plurality of to-be-printed points on the substrate that is placed on the top surface, the plurality of to-be-printed points forming a microarray, wherein, for each movement of the platform to one of the positions, the pipet module is aligned with a corresponding one of the to-be-printed points when the platform is moved to said one of the positions;

drive, by the driving unit, movement of the pipet module in a manner that the pipet module moves reciprocatively between a printing position adjacent to the top surface and a standby position distal from the top surface, wherein, upon completion of each movement of the platform to said one of the positions, the pipet module has moved from the standby position thereof to the printing position thereof, and drive, by the driving unit, the pipet module such that right when the platform is moved to said one of the positions, the pipet module discharges a predetermined amount of a corresponding one of the solution sample(s) onto the corresponding one of the to-be-printed points to form a bio-sensing spot, wherein a biochip is formed from the substrate and has a microarray of the bio-sensing spots respectively on the to-be-printed points after the main printing procedure is completed;

after the main printing procedure is completed, capturing, by the image capturing module, a first image of the biochip;

in response to receipt of the first image of the biochip from the image capturing module, determining, by the image analyzing module, whether each of the bio-sensing spots in the first image of the biochip satisfies a predetermined criterion so as to generate a first analysis result and output the first analysis result to the control module; and determining, by the control module, whether to execute a supplementary printing procedure for the biochip based on the first analysis result received from the image analyzing module.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
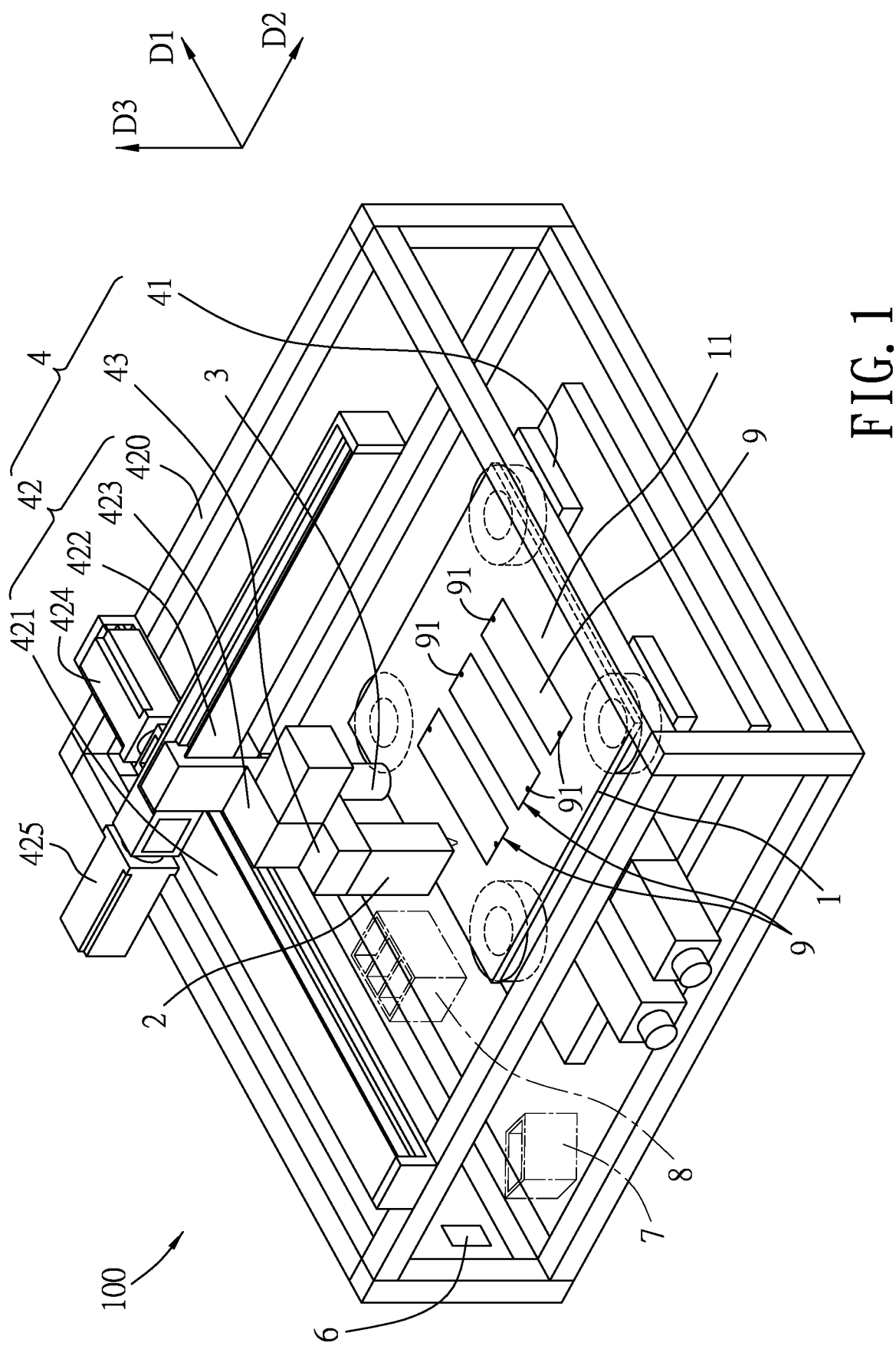
FIG. 1 is a schematic perspective view of a printing apparatus for biochip fabrication according to one embodiment of the present disclosure.
Figure 2:
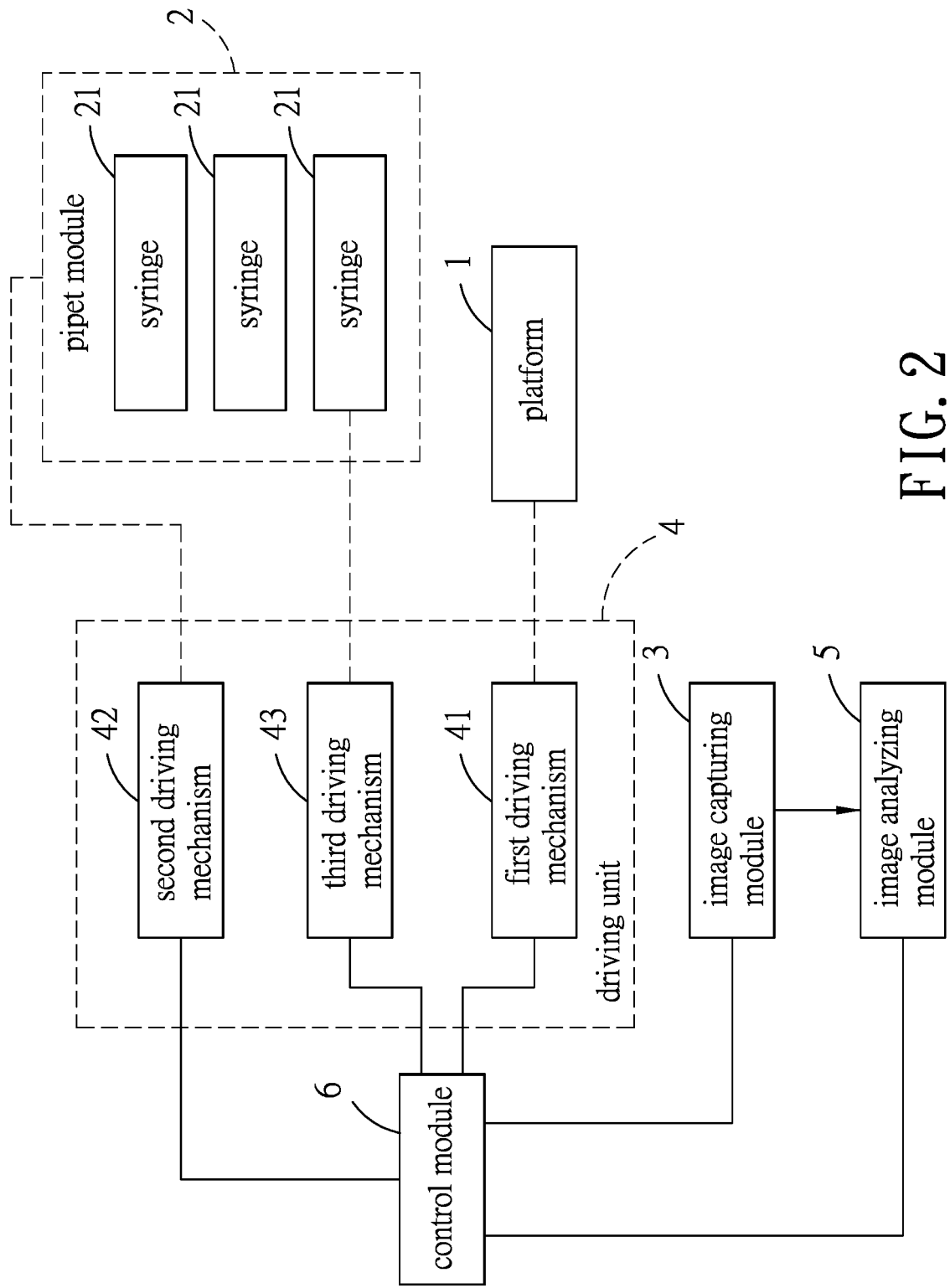
FIG. 2 is a schematic block diagram of the printing apparatus according to one embodiment of the present disclosure.
Figure 3:
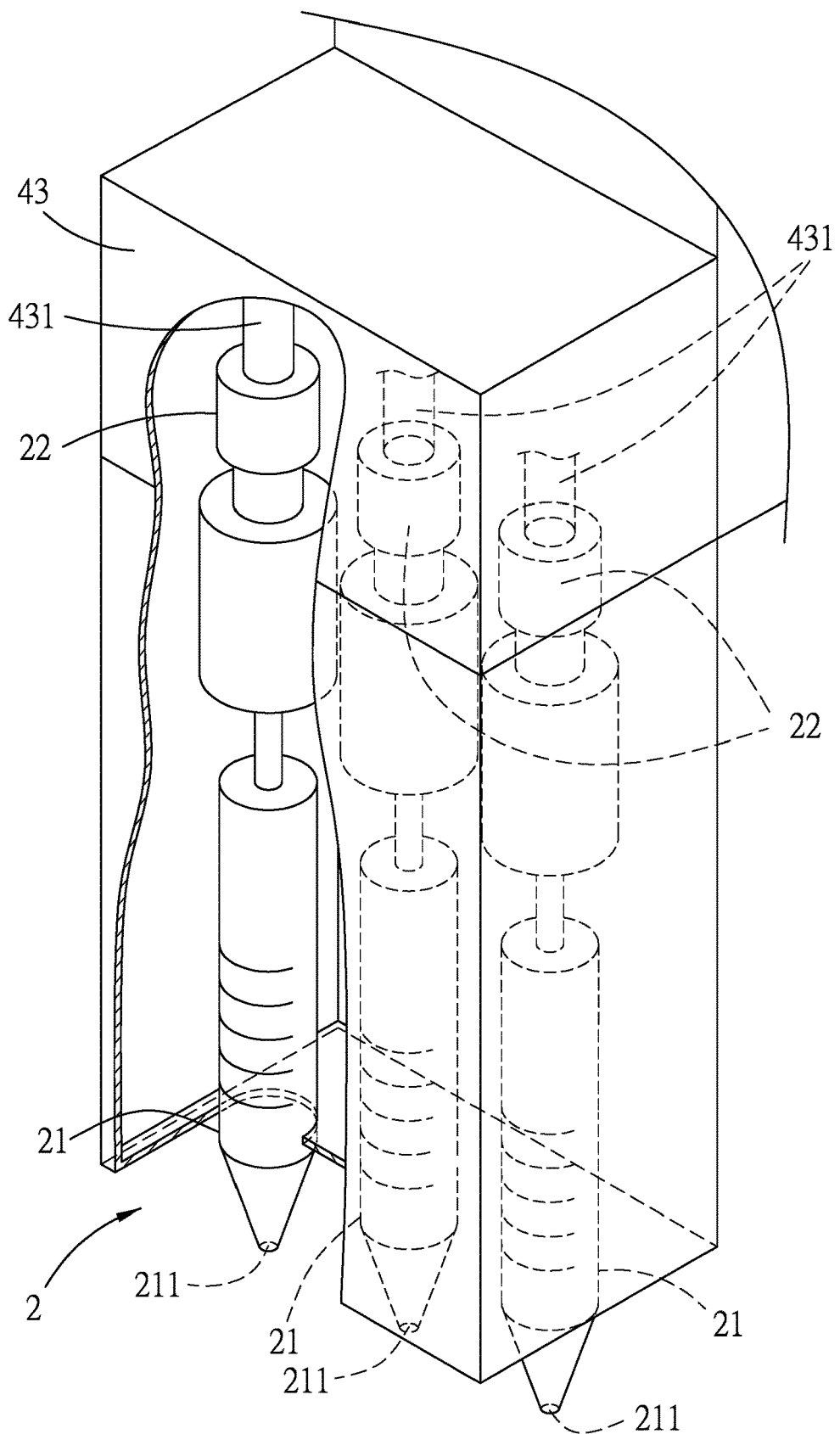
FIG. 3 is a fragmentary perspective view of a pipet module of the printing apparatus according to one embodiment of the present disclosure.

Referring to FIGS. 1 to 3, a printing apparatus 100 for biochip fabrication is provided. The printing apparatus 100 includes a platform 1, a pipet (or pipette) module 2, an image capturing module 3, a driving unit 4, an image analyzing module 5, a control module 6, a first storage tank 7 and a second storage tank 8. The platform 1 has a top surface 11 for supporting a plurality of substrates 9 such as glass slides thereon, and is movable in a manner that the top surface 11 is moved in an imaginary plane according to a first movement control signal from the control module 6. The pipet module 2 is disposed movably above the platform 1. In this embodiment, the pipet module 2 includes three syringes 21 respectively containing, e.g., three different kinds of solution samples therein, and each formed with an outlet 211 for discharging the respective solution sample. The image capturing module 3 is disposed above the platform 1 near the pipet module 2 and is configured to be activated by a triggering signal. In this embodiment, the image capturing module 3 is an area scan camera (e.g., an ace Series Charge-coupled Device (CCD) model No. acA1300-30 gm manufactured by Basler AG Corporation), and the present disclosure is not limited to this example.

The driving unit 4 is connected to the platform 1, the pipet module 2 and the image capturing module 3. The driving unit 4 is configured to drive movement of the platform 1 in a manner that the top surface 11 is moved in the imaginary plane without vertical movement or inclination (i.e., without vertical movement and also without inclination), to drive movement of the pipet module 2, and to drive movement of the pipet module 2 in a manner that the pipet module 2 discharges droplets of the solution samples through the outlets 211. The control module 6 is electrically connected to the image capturing module 3 and the driving unit 4, and is configured to execute a main printing procedure for each substrate 9.

In this embodiment, the driving unit 4 includes a first driving mechanism 41, a second driving mechanism 42 and a third driving mechanism 43 that are all electrically connected to the control module 6. The first driving mechanism 41 is connected to the platform 1, and is mounted under the platform 1. In one embodiment, the first driving mechanism 41 includes, for example, ball-screws, a motor and rails, and cooperates with the platform 1 to act as an XXY precision alignment stage, which is also known as an UVW alignment stage. The first driving mechanism 41 is configured to drive the platform 1 to move to a plurality of positions in sequence. Specifically, the top surface 11 of the platform 1 is moved without vertical movement or inclination.

The second driving mechanism 42 includes a main frame 420, a first rail 421, a second rail 422 and an elevating unit 423. The first rail 421 is mounted fixedly on the main frame 420 and extends in a first direction (D1) parallel to the top surface 11. The second rail 422 extends in a second direction (D2) transverse to the first direction (D1) and parallel to the top surface 11, and is mounted slidably on the first rail 421 to move along the first rail 421 in the first direction (D1). The elevating unit 423 is mounted on the second rail 422 with the pipet module 2 mounted thereon, and is configured to be driven by a second movement control signal from the control module 6 to move the pipet module 2 in a third direction (D3) transverse to the first direction (D1) and the second direction (D2), i.e., to reciprocatively move toward the top surface 11 to a printing position adjacent to the top surface 11 and away from the top surface 11 to a standby position distal from the top surface 11. In this embodiment, the image capturing module 3 is also mounted on the elevating unit 423. In one embodiment, the second driving mechanism 42 further includes a first motor 424 and a second motor 425. The first motor 424 is mounted on the first rail 421 and is configured to be driven, by a third movement control signal received from the control module 6, to move the second rail 422 along the first rail 421 in the first direction (D1). The second motor 425 is mounted on the second rail 422 and is configured to be driven, by a fourth movement control signal received from the control module 6, to move the elevating unit 423 along the second rail 422 in the second direction (D2). The third driving mechanism 43 is mounted on the elevating unit 423 to move together with the elevating unit 423, and is configured to drive the pipet module 2, by a printing control signal received from the control module 6, to discharge the solution samples. As a result, the second driving mechanism 42 is further configured to drive the third driving mechanism 43 and the image capturing module 3 together with the pipet module 2 to move in another imaginary plane defined cooperatively by the first and second rails 421, 422 above the top surface 11 of the platform 1 based on the third movement control signal and the fourth movement control signal.

As shown in FIG. 3, the pipet module 2 further includes three plungers 22 mounted respectively on the syringes 21, and the third driving mechanism 43 includes three connecting rods 431 connected respectively to the three plungers 22. Each of the connecting rods 431 is driven to move together with a respective one of the plungers 22 to drive the syringe 21 mounted with the respective one of the plungers 22 to discharge a predetermined amount of the respective solution sample through the outlet 211 of the syringe 21. In an ideal condition, the solution samples contained in the syringes 21 are bubble-less. However, in reality, the solution sample contained in each of the syringes 21 may more or less have bubbles. Note that the third driving mechanism 43 is configured to control movement of each of the connecting rods 431 according to the printing control signal so as to control each of the syringes 21 to discharge a desired amount of the respective solution sample, and the present disclosure is not limited to this example.

It should be noted that, in this embodiment, the solution samples are discharged out of the syringes 21 by virtue of the plungers 22 that are moved together with the respective connecting rods 431. In other embodiments, the plungers 22 may be omitted and the amount of each droplet of each solution sample to be discharged onto the substrate 9 is adjusted by controlling the duration that the outlets 211 of the syringes 21 come into contact with impressions formed on the substrate 9 by the control module 6.

In this embodiment, the control module 6 is implemented by, but not limited to, a digital signal processor (DSP), for example, a DSP-based 8-axis motion controller (model No. PCI-8258) manufactured by ADLINK Technology, Inc., and is capable of outputting the first movement control signal, the second movement control signal, the third movement control signal, the fourth movement control signal and the printing control signal respectively to the first driving mechanism 41, the elevating unit 423, the first motor 424, the second motor 425 and the third driving mechanism 43.

The image analyzing module 5 may refer to any device or portion of a device that processes electronic data from registers and/or memory to transform that electronic data into other electronic data. For example, the image analyzing module 5 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

In this embodiment, each substrate 9 has two positioning marks 91 on a top of the substrate 9 at opposite edges, respectively. For example, the positioning marks 91 may be substantially cross-shaped. It should be noted that, in other embodiments, the substrate 9 may have only one or more than two positioning marks 91, and arrangement of the positioning marks 91 are not limited to the arrangement shown in the drawings.

Figure 4:
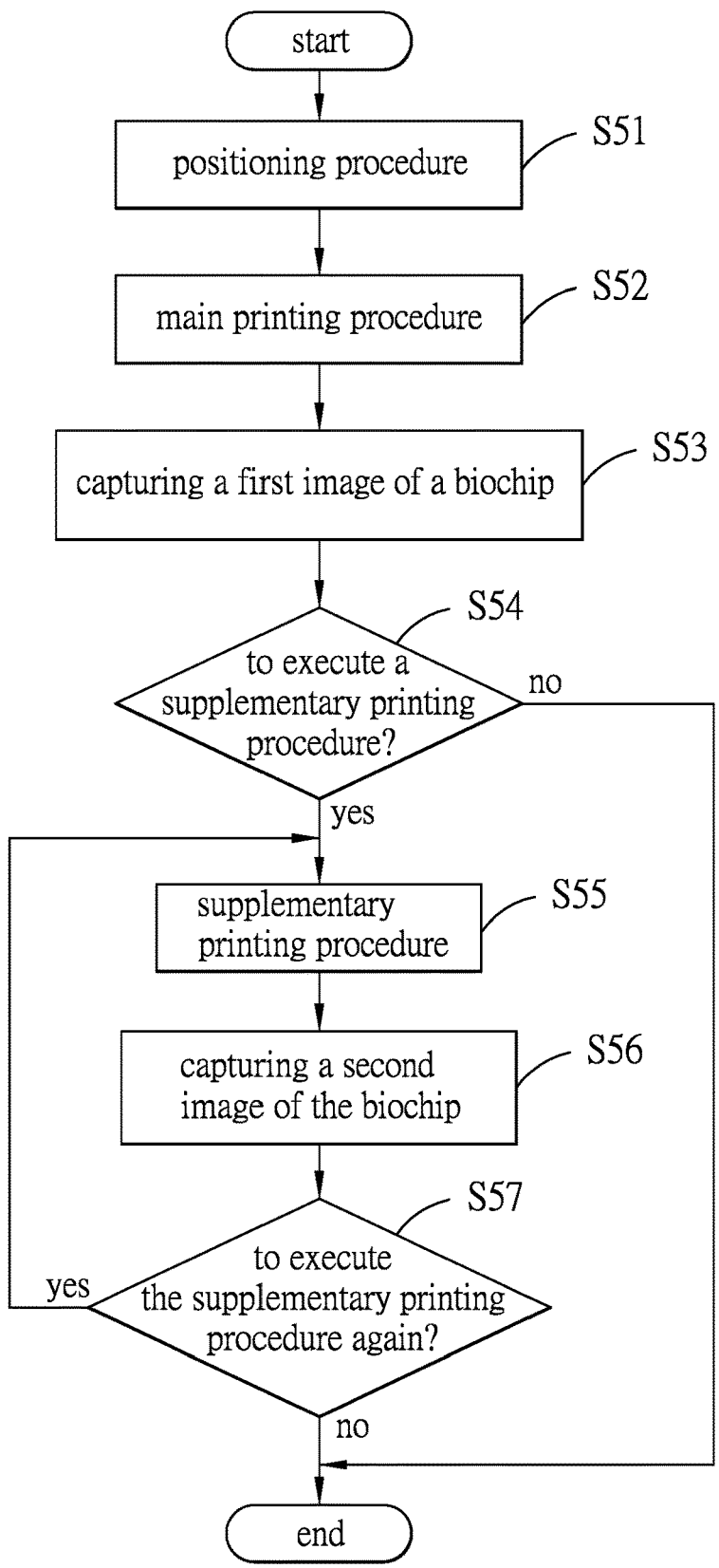
FIG. 4 is a flow chart of a printing method for biochip fabrication according to one embodiment of the present disclosure.

Further referring to FIG. 4, a printing method for biochip fabrication to be implemented by the above-mentioned printing apparatus 100 is provided.

In step S51, the printing apparatus 100 executes a positioning procedure for each of the substrates 9. In the positioning procedure, the image capturing module 3 captures an initial image of the substrate 9 disposed on the top surface 11 of the platform 1, e.g., the left one of the substrates 9 proximate to the first rail 421 in FIG. 1, and outputs the initial image to the image analyzing module 5. Then, in response to receipt of the initial image from the image capturing module 3, the image analyzing module 5 determines whether positions respectively of the positioning marks 91 on the substrate 9 in the initial image match two respective predetermined alignment positions, respectively. In this embodiment, the respective predetermined alignment positions are pre-stored in the image analyzing module 5. When it is determined that the position of any one of the positioning marks 91 in the initial image does not match a corresponding one of the predetermined alignment positions, the image analyzing module 5 outputs a positioning result indicating the unmatched position of any positioning mark 91 in the initial image that does not match the respective predetermined alignment position to the control module 6. Upon receipt of the unmatched position(s) in the initial image, the control module 6 controls the driving unit 4 to move the platform 1 based on the unmatched position(s). For example, the control module 6 generates and outputs a positioning signal based on the unmatched position(s), and outputs the positioning signal to the driving unit 4 so as to control the driving unit 4 to move the platform 1 in a manner that the position of each positioning mark 91 matches the corresponding one of the respective predetermined alignment positions. By doing so, each of the substrates 9 can be accurately positioned at a position where the positioning marks 91 on the substrate 9 match the respective predetermined alignment positions, respectively. The positioning procedure is completed upon movement of the platform 1, and the flow then proceeds to step S52. On the other hand, when it is determined that the positions of the positioning marks 91 in the initial image respectively match the predetermined alignment positions, the image analyzing module 5 outputs the positioning result indicating that positioning procedure of the substrate 9 is completed to the control module 6 and the flow then proceeds to step S52. In some embodiments, after the control module 6 controls the driving unit 4 to move the platform 1 based on the unmatched position(s), the positioning procedure is repeated until it is confirmed through image analysis that all of the substrates 9 are accurately positioned with the positions of the positioning marks 91 matching the predetermined alignment positions, respectively.

Figure 5:
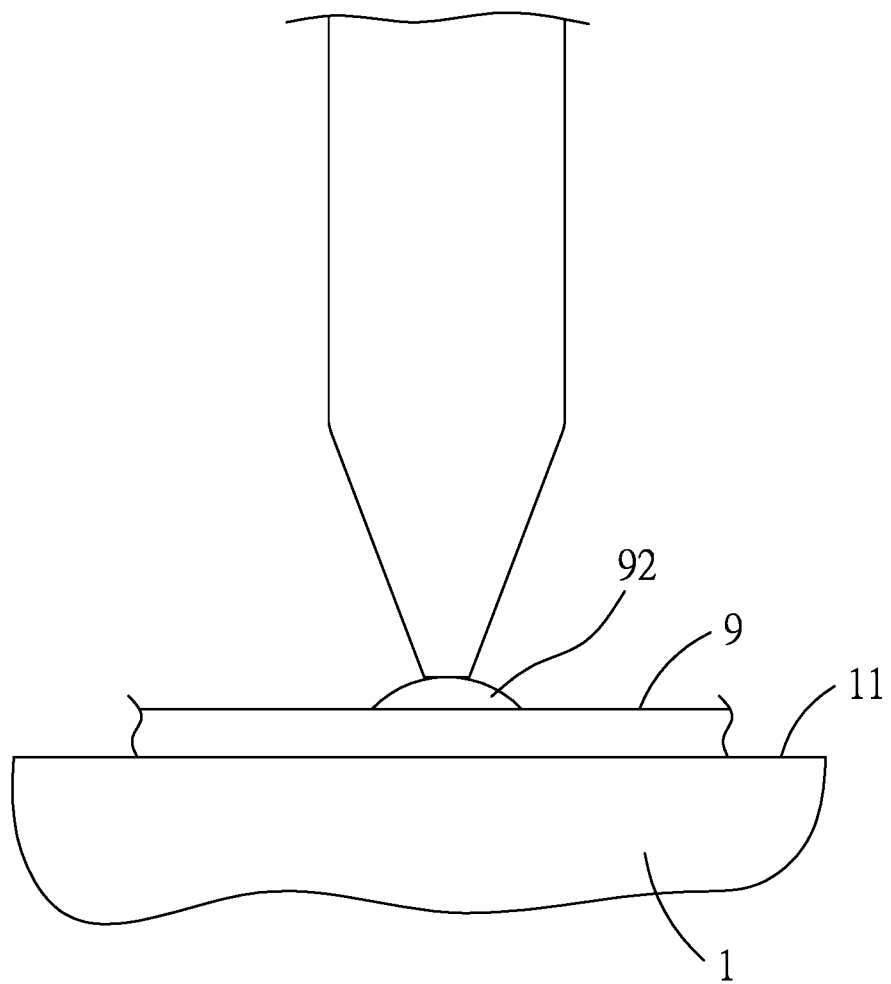
FIG. 5 is a fragmentary enlarged schematic side view illustrating the pipet module discharging a droplet of solution sample onto a substrate to form a bio-sensing spot.

In step S52, the control module 6 executes a main printing procedure for each of the substrates 9. In the main printing procedure, the first driving mechanism 41 of the driving unit 4 drives, as controlled by the control module 6, the platform 1 to move to a plurality of positions in sequence according to a predetermined route associated with a plurality of to-be-printed points on the substrate 9, where the to-be-printed points constitute a microarray. Specifically, the first driving mechanism 41 drives the platform 1 to move to one of the positions by the first movement control signal from the control module 6, and, for each movement of the platform 1 to one of the positions, each of the outlets 211 of the pipet module 2 is aligned with a corresponding one of the to-be-printed points when the platform 1 is moved to the position. Further, the elevating unit 423 drives, as controlled by the second movement control signal from the control module 6, movement of the pipet module 2 in a manner that each of the outlets 211 moves reciprocatively between the printing position thereof and the standby position thereof. Upon completion of each movement of the platform 1 to said one of the positions, each of the outlets 211 has moved from the standby position thereof to the printing position thereof. Note that the platform 1 and the pipet module 2 are driven to move at the same time in this embodiment. Further referring to FIG. 5, the third driving mechanism 43 is further driven, by the printing control signal from the control module 6, to drive the pipet module 2 in a manner that, right when the platform 1 is moved to one of the positions, the pipet module 2 discharges, through the corresponding one of the outlets 211, each of the solution samples in the predetermined amount onto the corresponding one of the to-be-printed points to form a corresponding bio-sensing spot 92, i.e., a biosensor (i.e., three bio-sensing spots of the three different types of solution samples in this embodiment). By repeating the above-mentioned operations in the main printing procedure for the plurality of positions, a biochip 90 is thus formed from the substrate 9 and has a microarray of the bio-sensing spots respectively on the to-be-printed points.

Subsequent to the main printing procedure, the flow of method goes to step S53. In step S53, the control module 6 outputs the triggering signal to the image capturing module 3 to make the image capturing module 3 capture a first image of the biochip 90 and transmits the first image to the image analyzing module 5. Then, step S54 is implemented to determine whether to execute a supplementary printing procedure for the biochip 90 based on the bio-sensing spots in the first image of the biochip 90.

Specifically, in step S54, the image analyzing module 5 first extracts, for each of the bio-sensing spots in the first image, an image part that corresponds to the bio-sensing spot from the first image, and estimates a maximum width of the bio-sensing spot with reference to the image part. In one embodiment, the image analyzing module 5 performs, for example, Gaussian blurring on the first image to filter out noise in the first image. Subsequently, the image analyzing module 5 further performs, for example, Hough transformation on the filtered first image to thereby estimate the maximum width of each bio-sensing spot. After obtaining the maximum width of each bio-sensing spot, the image analyzing module 5 determines whether the maximum width of each of the bio-sensing spots in the first image is not smaller than a threshold width, and generates and then outputs a first analysis result to the control module 6. The first analysis result indicates that all the bio-sensing spots in the first image of the biochip 90 satisfy the predetermined criterion and the main printing procedure is successfully executed to make the biochip 90 qualified when the maximum width of each bio-sensing spot is not smaller than the threshold width. On the other hand, when the maximum width of any one of the bio-sensing spots is smaller than the threshold width, the first analysis result indicates that at least one of the bio-sensing spots does not satisfy the predetermined criterion and the main printing procedure is not successful. Then, the control module 6 determines whether to execute the supplementary printing procedure for the biochip 90 based on the first analysis result in response to receipt of the first analysis result. Specifically, the control module 6 determines not to execute the supplementary printing procedure when the first analysis result indicates that the main printing procedure is successful and all the bio-sensing spots in the first image of the biochip 90 satisfy the predetermined criterion, and determines to execute the supplementary printing procedure when the first result indicates that at least one of the bio-sensing spots in the first image does not satisfy the predetermined criterion. Any bio-sensing spot not satisfying the predetermined criterion (i.e., having an estimated maximum width smaller than the threshold width) serves as a target spot and is referred to as a defective spot hereinafter. When the determination made in step S54 is negative, the flow of method terminates and the main printing procedure is determined to have been executed successfully to make the biochip 90 qualified; otherwise, the flow of the method goes to step S55 for executing the supplementary printing procedure. In this embodiment, when it is determined that there is one or more defective spots in the first image, the first analysis result generated by the image analyzing module 5 further includes estimated maximum width of each defective spot and a position data set that is related to a position of each defective spot. In some embodiments, the image analyzing module 5 further transmits, to the control module 6, the maximum width of each defective spot.

Figure 6:
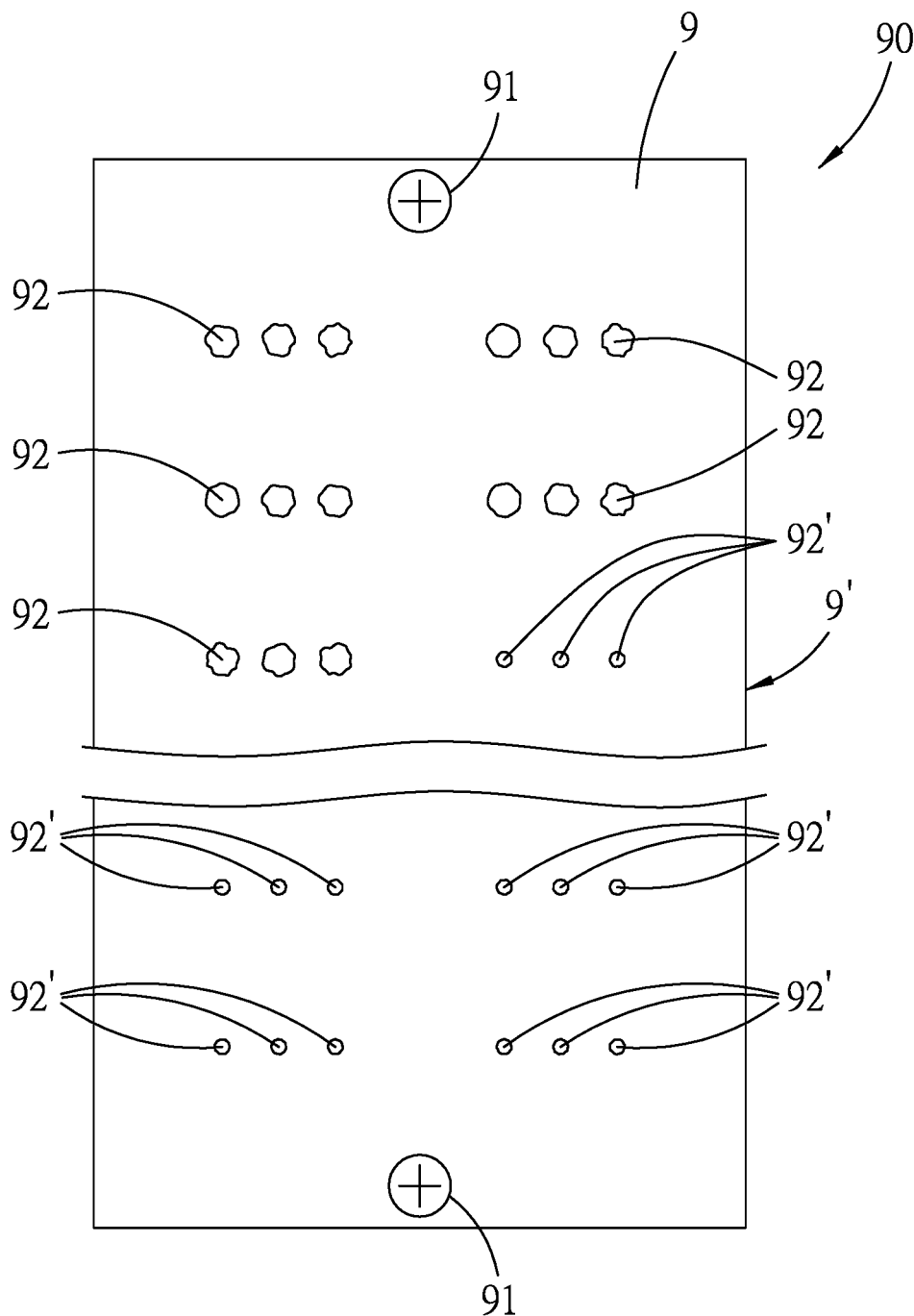
FIG. 6 is schematic fragmentary top view illustrating a biochip on which a microarray of bio-sensing spots are formed.

Further referring to FIG. 6, some examples of qualified bio-sensing spots 92 and unqualified bio-sensing spots 92' (i.e., defective spots) are shown. Ideally, when a droplet of any solution sample discharged from the corresponding syringe 21 has no bubbles, the predetermined amount of the solution sample should make the maximum width of the bio-sensing spot 92 formed on the substrate 9 not smaller than the threshold width. On the other hand, when the solution sample discharged from the syringe 21 has some bubbles, the bubbles would burst when the solution sample contacts the substrate 9 and the maximum width of the bio-sensing spot thus formed would be smaller than the threshold width, making it a defective spot 92'. Note that in other embodiments, the predetermined criterion may relate to the area of each bio-sensing spot and the present disclosure is not limited to the example.

In step S55, the supplementary printing procedure is executed in a manner similar to the main printing procedure. In the supplementary printing procedure, the driving unit 4 drives the platform 1, as controlled by the control module 6, to move so as to align an associated one of the outlets 211 of the pipet module 2 with one defective spot 92' according to the position data set when the platform 1 is moved to a supplementary-printing one of the positions corresponding to the position of the defective spot 92'. In an exemplary case, the platform 1 is driven to move such that the three outlets 211 of the pipet module 2 are aligned respectively with three bio-sensing spots of a row including at least one detective spot 92', in each movement. By this way, as shown in FIG. 6, the three outlets 211 of the pipet module 2 are aligned respectively with three defective spots 92' of a row in each movement. For each of the defective spots 92', the control module 6 calculates a supplementary amount of the corresponding solution sample based on the maximum width of the defective spot 92'. The driving unit 4 drives the pipet module 2 in a manner that the associated one of the outlets 211 has moved from the standby position thereof to the printing position thereof upon completion of each movement of the platform 1 to the supplementary-printing one of the positions corresponding to the position of one defective spot 92'. The driving unit 4 drives the pipet module 2 such that, right when the platform 1 is moved to one of the positions corresponding to the position of the defective spot 92', the pipet module 2 discharges the supplementary amount of the corresponding solution sample onto the defective spot 92' through a corresponding one of the outlets 211. In some embodiments, the pipet module 2 is driven to discharge the predetermined amount of the solution sample in the supplementary printing procedure, and the present disclosure is not limited to the example described herein.

After the supplementary printing procedure, the flow of method goes to step S56. In step S56, the image capturing module 3 captures a second image of the biochip 90 and transmits the second image to the image analyzing module 5. Then, step S57 is implemented to determine whether to execute the supplementary printing procedure again, and is similar to step S54. In step S57, the image analyzing module 5 determines whether each (previously) defective spot in the second image of the biochip 90 satisfies the predetermined criterion, i.e., whether the maximum width of each (previously) defective spot in the second image is not smaller than the threshold width, so as to generate a second analysis result, and outputs the second analysis result to the control module 6 such that the control module 6 determines whether to execute the supplementary printing procedure again for the biochip 90 based on the second analysis result. When the control module 6 determines not to execute the supplementary printing procedure, again, the flow of the method terminates; otherwise, the flow of the method goes back to step S55 and steps S55-S57 are repeated. That is to say, the supplementary printing procedure would be repeatedly performed until all the bio-sensing spots in the image of the biochip 90 captured by the image capturing module 3 satisfy the predetermined criterion.

After one biochip 90 is made to standard (completed), the printing method can be repeatedly performed to create more biochips as required. By doing so, the yield rate of the biochips can be increased significantly. Note that, after one biochip 90 is completed and the printing method is performed for the second time, in the positioning step of S51, the control module 6 outputs the first movement control signal to drive the first driving mechanism 41 to move the platform 1 to a position where the positioning marks 91 on a second one of the substrates 9 (the middle one of the substrates 9 in FIG. 1) in an initial image of the second one of the substrates 9 respectively match two predetermined alignment positions. In one embodiment, the positioning step S51 of the printing method that is performed after the first biochip 90 is completed can be omitted since all of the substrates 9 are supposed to be positioned properly when the positioning step S51 is performed for the first time.

The first storage tank 7 contains cleaning solution used for cleaning the pipet module 2, and the second storage tank 8 is divided into three storage spaces containing the three kinds of solution samples, respectively. In one embodiment, when it is required, the control module 6 may output the third movement control signal and the fourth movement control signal to the driving unit 4 to move the pipet module 2 to a position above the first storage tank 7 or to move the pipet module 2 to a position above the second storage tank 8, and then the pipet module 2 can be controlled to draw the cleaning solution from the first storage tank 7 or to draw the solution samples from the second storage tank 8.

To sum up, in the present disclosure, by virtue of the positioning procedure, the printing apparatus 100 is capable of effectively and accurately positioning the substrates 9 placed on the top surface 11 of the platform 1. In addition, since the pipet module 2 is moved reciprocatively toward and away from the platform 1 as the platform 1 is moved to the position in the main printing procedure, the printing method according to this disclosure is relatively efficient. Further, by determining whether each bio-sensing spot formed by the printing apparatus 100 satisfies the predetermined criterion, the supplementary printing procedure can be performed until all of the bio-sensing spots thus formed satisfy the predetermined criterion. Therefore, the amount of each bio-sensing spot on the biochip 90 is sufficient to perform biochemical reactions and a relatively high yield rate in making the biochips 90 is consequently provided.

In an embodiment, the disclosure relates to a printing apparatus for making a biochip, including:
  a platform configured to be moved on an imaginary plane, and having a top surface for supporting a substrate thereon and parallel to the imaginary plane;
  a pipet module disposed above the platform, configured to be moved relative to the platform and to contain solution sample therein, and including at least one outlet for discharging the solution sample onto the substrate;
  an image capturing module disposed above the platform near the pipet module, facing the top surface, and configured to be moved relative to the platform together with the pipet module and to be driven by a triggering signal to capture an image;
  a driving unit connected to the platform, the pipet module and the image capturing module, and configured to drive the platform to move in a manner that the upper surface is moved parallel to the imaginary plane without vertical movement and without inclination, to drive the pipet module and the image capturing module to move relative to the upper surface, and to drive the pipet module to discharge a droplet of the solution sample through the outlet;
  a control module electrically connected to the driving unit and the image capturing module, and configured to execute a main printing procedure to
    control the driving unit to drive the platform to move to a plurality of predetermined positions in sequence according to a predetermined route associated with a plurality of predetermined points on the upper surface that correspond respectively to a plurality of to-be-printed points on the substrate that is positioned on the upper surface, the plurality of to-be-printed points forming a microarray, wherein, for each movement of the platform to one of the predetermined positions, the corresponding one of the to-be-printed points is aligned with the outlet of the pipet module when the platform is moved to the predetermined position,
    control the driving unit to drive the pipet module to move reciprocatively toward the upper surface to a printing position and away from the upper surface to a standby position, wherein, during each movement of the platform to one of the predetermined positions, the pipet module is moved to the printing position as the platform is moved to the predetermined position, and
    upon the pipet module being moved to the printing position, control the driving unit to drive the pipet module to discharge a droplet of the solution sample through the outlet onto the corresponding one of the to-be-printed points to forma bio-sensing spot,
    wherein, after the main printing procedure is completed, a biochip is formed from the substrate and has a microarray of the bio-sensing spots respectively on the to-be-printed points, and the control module is further configured to output the triggering signal to the image capturing module to make the image capturing module capture a first image of the biochip; and an image analyzing module electrically connected to the image capturing module and the control module, and configured to, in response to receipt of the first image of the biochip from the image capturing module, determine whether each of the bio-sensing spots in the first image of the biochip satisfies a predetermined criterion and output a first result of the determination to the control module.

In a further embodiment, the disclosure relates to at least one of the preceding embodiments, wherein the pipet module is controlled by the driving unit to discharge, through the outlet, a predetermined amount of the solution sample onto each of the to-be-printed points.

In a further embodiment, the disclosure relates to at least one of the preceding embodiments, wherein, the control module is further configured to determine whether to execute a supplementary printing procedure for the biochip based on the first result received from the image analyzing module.

In a further embodiment, the disclosure relates to at least one of the preceding embodiments, wherein, when the first result of the determination indicates that all the bio-sensing spots in the first image of the biochip satisfy the predetermined criterion, the control module is configured to determine not to execute the supplementary printing procedure.

In a further embodiment, the disclosure relates to at least one of the preceding embodiments, wherein, when it is determined that at least one of the bio-sensing spots in the first image does not satisfy the predetermined criterion, the image analyzing module is further configured to transmit, to the control module, a position data set that is related to a position of the at least one of the bio-sensing spots,
  wherein the control module is further configured to, when executing the supplementary printing procedure, control the driving unit to
    according to the position data set, drive the platform and the pipet module to move so as to align the pipet module with the at least one of the bio-sensing spots when the platform is moved to one of the predetermined positions that corresponds to the position of the at least one of the bio-sensing spots, and
    drive the pipet module to move toward the upper surface to the printing position as the platform is moved to the one of the predetermined positions that corresponds to the position of the at least one of the bio-sensing spots,
  upon the pipet module being moved to the printing position, the pipet module is controlled to discharge a droplet of the solution sample through the outlet onto the at least one of the bio-sensing spots. In a further embodiment, the disclosure relates to at least one of the preceding embodiments, wherein, the pipet module is controlled by the driving unit to discharge, through the outlet, the predetermined amount of the solution sample onto the at least one of the bio-sensing spots in the supplementary printing procedure.

In a further embodiment, the disclosure relates to at least one of the preceding embodiments, wherein, after the supplementary printing procedure is completed, the control module is further configured to output the triggering signal to the image capturing module to make the image capturing module capture a second image of the biochip,
  wherein the image analyzing module is configured to, in response to receipt of the second image of the biochip from the image capturing module, determine whether the at least one of the bio-sensing spots in the second image of the biochip satisfies the predetermined criterion and output a second result of the determination to the control module,
  wherein the control module is further configured to determine whether to execute the supplementary printing procedure again for the biochip based on the second result received from the image analyzing module. In a further embodiment, the disclosure relates to at least one of the preceding embodiments, wherein, in response to receipt of the first image, the image analyzing module is configured to acquire a plurality of image parts that correspond respectively to the bio-sensing spots from the first image, and, for each of the image parts, to estimate with reference to the image part a maximum width of the bio-sensing spot that corresponds to the image part and to determine whether the predetermined criterion is satisfied by determining whether the maximum width of the bio-sensing spot is not smaller than the threshold width,
  wherein, in response to receipt of the second image, the image analyzing module is configured to acquire at least one image part that corresponds to the at least one of the bio-sensing spots from the second image, to estimate a maximum width of the at least one of the bio-sensing spots with reference to the at least one image part, and to determine whether the predetermined criterion is satisfied by determining whether the maximum width of the at least one of the bio-sensing spots is not smaller than the threshold width.

In a further embodiment, the disclosure relates to at least one of the preceding embodiments, wherein, when it is determined that at least one of the bio-sensing spots in the first image does not satisfy the predetermined criterion, the image analyzing module is further configured to transmit, to the control module, the maximum width of the at least one of the bio-sensing spots,
  wherein the control module is configured to, when executing the supplementary printing procedure, control the driving unit to drive the pipet module to discharge a supplementary amount of the solution sample through the outlet onto the at least one of the bio-sensing spots, the supplementary amount being related to the maximum width of the at least one of the bio-sensing spots.

In a further embodiment, the disclosure relates to at least one of the preceding embodiments, wherein, the driving unit includes:
  a first driving mechanism connected to the platform, electrically connected to the control module, and configured to drive the platform to move to the predetermined positions in sequence in a manner that the upper surface is moved without vertical movement and without inclination according to a first movement control signal received from the control module;
  a second driving mechanism electrically connected to the control module and including
    a first rail which extends in a first direction parallel to the upper surface,
    a second rail which extends in a second direction transverse to the first direction and parallel to the upper surface, and which is mounted slidably on the first rail to move along the first rail in the first direction, and
    an elevating unit which is mounted on the second rail, on which the pipet module is mounted, and which is configured to be driven by a second movement control signal from the control module to move the pipet module in a third direction transverse to the first direction and the second direction; and a third driving mechanism electrically connected to the control module, mounted on the elevating unit to move together with the elevating unit, and configured to drive the pipet module, by a printing control signal from the control module, to discharge the solution sample.

In a further embodiment, the disclosure relates to at least one of the preceding embodiments, wherein, the second driving mechanism further includes:

a first motor mounted on the first rail and configured to be driven, by a third movement control signal received from the control module, to move the second rail along the first rail in the first direction; and a second motor mounted on the second rail and configured to be driven, by a fourth movement control signal received from the control module, to move the elevating unit along the second rail in the second direction.

In a further embodiment, the disclosure relates to at least one of the preceding embodiments, the substrate having at least one positioning mark, wherein, the control module is further configured to output the triggering signal, before executing the main printing procedure, to the image capturing module to drive the image capturing module to capture an initial image of the substrate disposed on the upper surface, wherein the image analyzing module is further configured to determine whether a position of the positioning mark in the initial image matches a predetermined alignment position, to output a positioning result to the control module when the image analyzing module determines that the position of the positioning mark in the initial image matches the predetermined alignment position, and to output the position of the positioning mark in the initial image to the control module when the image analyzing module determines that the position of the positioning mark in the initial image does not match the predetermined alignment position, wherein the control module is configured to execute the main printing procedure in response to receipt of the positioning result from the image analyzing module, and to drive the driving unit to move the platform based on the position of the positioning mark in the initial image in response to receipt of the position of the positioning mark from the image analyzing module.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A printing apparatus for biochip fabrication, comprising:

a platform having a top surface for supporting one or more substrates thereon, said platform being movable in a manner that said top surface is moved in an imaginary plane;

a pipet module disposed movably above said platform and configured to contain optionally one or more solution samples therein, said pipet module being formed with one or more outlets each discharging a corresponding one of the solution sample(s);

an image capturing module disposed movably above said platform near said pipet module, and configured to be activated in response to a triggering signal;

a driving unit connected to said platform, said pipet module and said image capturing module, and configured to drive movement of each of said platform and said pipet module in a manner that said top surface is movable in the imaginary plane and that said pipet module is movable above said top surface, and to drive operation of said pipet module in a manner that said pipet module discharges the solution sample(s) through at least one of said outlet(s);

a control module electrically connected to said driving unit and said image capturing module, and configured to execute a main printing procedure for each of the substrate(s) to control said driving unit to drive said platform to move to a plurality of positions in sequence according to a predetermined route associated with a plurality of to-be-printed points on the substrate that is placed on said top surface, the plurality of to-be-printed points forming a microarray, wherein, for each movement of said platform to one of the positions, each of said outlet(s) of said pipet module is aligned with a corresponding one of the to-be-printed points when said platform is moved to said one of the positions, control said driving unit to drive movement of said pipet module in a manner that each of said outlet(s) moves reciprocatively between a printing position adjacent to said top surface, and a standby position distal from said top surface, wherein, upon completion of each movement of said platform to said one of the positions, each of said outlet(s) has moved from the standby position thereof to the printing position thereof, and control said driving unit to drive said pipet module such that, right when said platform is moved to said one of the positions, said pipet module discharges, through each of said outlet(s), a droplet of a corresponding one of the solution sample(s) onto the corresponding one of the to-be-printed points to form a bio-sensing spot, wherein, after the main printing procedure is completed, a biochip is formed from the substrate and has a microarray of the bio-sensing spots respectively on the to-be-printed points, and said control module is further configured to output the triggering signal to said image capturing module such that said image capturing module is activated in response to the triggering signal to capture a first image of the biochip; and an image analyzing module electrically connected to said image capturing module and said control module, and configured to, in response to receipt of the first image of the biochip from said image capturing module, determine whether each of the bio-sensing spots in the first image of the biochip satisfies a predetermined criterion so as to generate a first analysis result and to output the first analysis result to said control module.

2. The printing apparatus as claimed in claim 1, wherein said pipet module is controlled by said driving unit to discharge, through each of said outlet(s), a predetermined amount of the corresponding one of the solution sample(s) onto one of the to-be-printed points.

3. The printing apparatus as claimed in claim 2, wherein said control module is further configured to determine whether to execute a supplementary printing procedure for the biochip based on the first analysis result received from said image analyzing module.

4. The printing apparatus as claimed in claim 3, wherein, when the first analysis result indicates that all the bio-sensing spots in the first image of the biochip satisfy the predetermined criterion, said control module is configured to determine not to execute the supplementary printing procedure.

5. The printing apparatus as claimed in claim 3, wherein, when said image analyzing module determines that one or more of the bio-sensing spots serving as target spot(s) in the first image does/do not satisfy the predetermined criterion, the first analysis result generated by said image analyzing module further includes one or more position data sets that is/are related to position(s) respectively of the target spot(s),
wherein said control module is further configured to, when executing the supplementary printing procedure, control said driving unit to, with respect to the target spot(s),
according to the position data set(s), drive movement of said platform in a manner that each of the target spot(s) is aligned with an associated one of said outlet(s) of said pipet module when said platform is moved to a supplementary-printing one of the positions that corresponds to the position of the target spot,
drive movement of said pipet module in a manner that said associated one of said outlet(s) has moved from the standby position to the printing position upon completion of each movement of said platform to said supplementary-printing one of the positions, and
control said driving unit to drive said pipet module such that, right when said platform is moved to said supplementary-printing one of the positions, said pipet module discharges, through said associated one of said outlet(s), a droplet of a corresponding one of the solution sample(s) onto the target spot.

6. The printing apparatus as claimed in claim 5, wherein for each of the target spot(s), said pipet module is controlled by said driving unit to discharge, through said associated one of said outlet(s), the predetermined amount of the corresponding one of solution sample(s) onto the target spot in the supplementary printing procedure.

7. The printing apparatus as claimed in claim 5, wherein after the supplementary printing procedure is completed, said control module is further configured to output the triggering signal to said image capturing module such that said image capturing module is activated again in response to receipt of the trigger signal to capture a second image of the biochip,
wherein said image analyzing module is configured to, in response to receipt of the second image of the biochip from said image capturing module, determine whether the target spot(s) in the second image of the biochip satisfies the predetermined criterion so as to generate a second analysis result and to output the second analysis result to said control module, and
wherein said control module is further configured to determine whether to execute the supplementary printing procedure again for the biochip based on the second analysis result received from said image analyzing module.

8. The printing apparatus as claimed in claim 7, wherein the predetermined criterion includes a threshold width,
wherein, in response to receipt of the first image, said image analyzing module is configured to extract from the first image a plurality of image parts that correspond respectively to the bio-sensing spots, and, for each of the image parts, to estimate, with reference to the image part, a maximum width of the bio-sensing spot that corresponds to the image part and to determine whether the predetermined criterion is satisfied by determining whether the estimated maximum width of the bio-sensing spot is not smaller than the threshold width, and
wherein, in response to receipt of the second image, said image analyzing module is configured to extract from the second image one or more image parts that does/do correspond (respectively) to the target spot(s), to estimate a maximum width of each of the target spot(s) with reference to a respective one of said image part(s), and to determine whether the predetermined criterion is satisfied by determining whether the estimated maximum width of each of the target spot(s) is not smaller than the threshold width.

9. The printing apparatus as claimed in claim 8, wherein, when said image analyzing module determines that the target spot(s) does/do not satisfy the predetermined criterion, the first analysis result generated by said image analyzing module further includes the estimated maximum width of each of the target spot(s), and
wherein said control module is configured to, when executing the supplementary printing procedure, for each of the target spot(s), control said driving unit to drive said pipet module to discharge a supplementary amount of the corresponding one of the solution sample(s) through said associated one of said outlet(s) onto the target spot, the supplementary amount being related to the estimated maximum width of the target spot.

10. The printing apparatus as claimed in claim 1, wherein said driving unit includes:
a first driving mechanism connected to said platform, electrically connected to said control module, and configured to drive movement of said platform, during the main printing procedure for each of the substrate(s), based on a first movement control signal that is generated by said control module;
a second driving mechanism electrically connected to said control module, mounted with said pipet module and said image capturing module, and configured to drive movement of said pipet module, during the main printing procedure for each of the substrate(s), based on a second movement control signal, so that each of said outlet(s) moves reciprocatively between the standby position and the printing position; and
a third driving mechanism electrically connected to said control module, mounted to said second driving mechanism, and configured to drive said pipet module, during the main printing procedure for each of the substrate(s), to discharge the solution sample(s) through said outlet (s) of said pipet module based on a printing control signal that is generated by said control module.

11. The printing apparatus as claimed in claim 10, wherein said second driving mechanism is further configured to drive said third driving mechanism and said image capturing module together with said pipet module to move in another imaginary plane above said top surface of said platform based on a third movement control signal and a fourth movement control signal that are generated by said control module.

12. The printing apparatus as claimed in claim 1, each of the substrate(s) having one or more positioning marks formed on a top thereof, wherein said control module is further configured to output the triggering signal, before executing the main printing procedure for each of the substrate(s) placed on said top surface, to said image capturing module such that said image capturing module is activated in response to receipt of the triggering signal to capture an initial image of the substrate, wherein said image analyzing module is further configured to determine whether a position of each of the positioning mark(s) in the initial image matches a respective predetermined alignment position so as to obtain a positioning result and to output the positioning result to said control module, wherein, when said image analyzing module determines that the position of each of the positioning mark(s) in the initial image matches the respective predetermined alignment position, the positioning result obtained by said image analyzing module indicates that positioning of the substrate is completed such that said control module starts execution of the main printing procedure in response to the positioning result, and wherein, when said image analyzing module determines that the position of at least one of the positioning mark(s) in the initial image does not match the respective predetermined alignment position, the positioning result obtained by said image analyzing module indicates the position of said at least one of the positioning mark(s) in the initial image, and said control module is further configured to generate a positioning control signal based on the positioning result and to output the positioning control signal to said second driving mechanism such that said second driving mechanism is further configured to drive, based on the positioning control signal, movement of the platform in a manner that the position of at least one of the positioning mark(s) in the initial image matches the respective predetermined alignment position.

13. A printing method for biochip fabrication to be implemented by a printing apparatus, the printing apparatus including a platform that has a top surface supporting one or more substrates thereon and that is movable in a manner that the top surface is moved in an imaginary plane, a pipet module that is disposed movably above the platform, and that contains optionally one or more solution samples therein, an image capturing module, a driving unit, an image analyzing module, and a control module, the method comprising steps of:

executing a main printing procedure for each of the substrate(s) to
drive, by the driving unit, movement of the platform to a plurality of positions in sequence according to a predetermined route associated with a plurality of to-be-printed points on the substrate that is placed on the top surface, the plurality of to-be-printed points forming a microarray, wherein, for each movement of the platform to one of the positions, the pipet module is aligned with a corresponding one of the to-be-printed points when the platform is moved to said one of the positions;

drive, by the driving unit, movement of the pipet module in a manner that the pipet module moves reciprocatively between a printing position adjacent to the top surface and a standby position distal from the top surface, wherein, upon completion of each movement of the platform to said one of the positions, the pipet module has moved from the standby position thereof to the printing position thereof, and drive, by the driving unit, the pipet module such that right when the platform is moved to said one of the positions, the pipet module discharges a predetermined amount of a corresponding one of the solution sample(s) onto the corresponding one of the to-be-printed points to form a bio-sensing spot, wherein a biochip is formed from the substrate and has a microarray of the bio-sensing spots respectively on the to-be-printed points after the main printing procedure is completed;

after the main printing procedure is completed, capturing, by the image capturing module, a first image of the biochip;

in response to receipt of the first image of the biochip from the image capturing module, determining, by the image analyzing module, whether each of the bio-sensing spots in the first image of the biochip satisfies a predetermined criterion so as to generate a first analysis result and output the first analysis result to the control module; and determining, by the control module, whether to execute a supplementary printing procedure for the biochip based on the first analysis result received from the image analyzing module.

14. The printing method as claimed in claim 13, wherein the step of determining whether each of the bio-sensing spots in the first image of the biochip satisfies a predetermined criterion includes, for each of the bio-sensing spots in the first image:

extracting an image part that corresponds to the bio-sensing spot from the first image;

estimating a maximum width of the bio-sensing spot with reference to the image part;

determining whether the estimated maximum width of the bio-sensing spot is not smaller than a threshold width;

determining that the bio-sensing spot does not satisfy the predetermined criterion when the estimated maximum width of the bio-sensing spot is smaller than the threshold width; and determining that the bio-sensing spot satisfies the predetermined criterion when the estimated maximum width of the bio-sensing spot is not smaller than the threshold width.

15. The printing method as claimed in claim 14, wherein, the step of determining whether to execute a supplementary printing procedure includes determining not to execute the supplementary printing procedure when the first analysis result of the determination indicates that all the bio-sensing spots in the first image of the biochip satisfy the predetermined criterion, and determining to execute the supplementary printing procedure when the first analysis result of the determination indicates that one or more of the bio-sensing spots in the first image does/do not satisfy the predetermined criterion.

16. The printing method as claimed in claim 15, wherein the supplementary procedure includes:
with respect to each of the one or more of the bio-sensing spots,
driving, by the driving unit, movement of each of the platform and the pipet module so as to align the pipet module with the bio-sensing spot according to a position data set that is related to a position of the bio-sensing spot when the platform is moved to one of the positions that corresponds to the position of the bio-sensing spot; and
driving, by the driving unit, the pipet module to move toward the top surface to the printing position as the platform is moved to the one of the positions that corresponds to the position of the bio-sensing spot,
driving, by the driving unit, the pipet module such that, right when the platform moves to said one of the positions that corresponds to the position of the bio-sensing spot, the pipet module discharges a droplet of a corresponding one of the solution sample(s) onto the bio-sensing spot.

17. The printing method as claimed in claim 16, further comprising, after the supplementary printing procedure, steps of:
capturing, by the image capturing module, a second image of the biochip;
in response to receipt of the second image of the biochip from the image capturing module, determining, by the image analyzing module, whether said each of one or more of the bio-sensing spots in the second image of the biochip satisfies the predetermined criterion and outputting a second analysis result of the determination to the control module; and
determining, by the control module, whether to execute the supplementary printing procedure again for the biochip based on the second analysis result received from the image analyzing module.

18. The printing method as claimed in claim 16, wherein the supplementary procedure further includes, with respect to each of the one or more of the bio-sensing spots, calculating, by the control module, a supplementary amount based on the estimated maximum width of the bio-sensing spot, and the step of driving the pipet module to discharge a droplet of a corresponding one of the solution sample(s) onto the bio-sensing spot is to discharge the supplementary amount of the corresponding one of the solution sample(s) onto the bio-sensing spot.

19. The printing method as claimed in claim 13, further comprising steps, before the step of executing a main printing procedure, of:
for each of the substrate(s),
capturing, by the image capturing module, an initial image of the substrate;
determining, by the image analyzing module, whether a position of a positioning mark on the substrate in the initial image matches a respective predetermined alignment position;
outputting, by the image analyzing module, a positioning result to the control module when determining that the position of the positioning mark in the initial image matches the respective predetermined alignment position;
outputting, by the image analyzing module, the position of the positioning mark in the initial image to the control module when determining that the position of the positioning mark in the initial image does not match the respective predetermined alignment position;
controlling, by the control module, the driving unit to implement the steps of driving movement of the platform and the pipet module, and driving the pipet module to discharge a predetermined amount of a corresponding one of the solution sample(s) in response to receipt of the positioning result from said image analyzing module; and
controlling, by the control module, the driving unit to move the platform based on the position of the positioning mark in the initial image in response to receipt of the position of the positioning mark from the image analyzing module.

* * * * *